United States Patent [19]

Palmer et al.

[11] 4,421,731

[45] * Dec. 20, 1983

[54] PROCESS FOR PURIFYING PHOSPHOGYPSUM

[75] Inventors: Jay W. Palmer, Tampa, Fla.; John C. Gaynor, Des Plaines, Ill.

[73] Assignee: United States Gypsum Company, Chicago, Ill.

[ * ] Notice: The portion of the term of this patent subsequent to Jun. 14, 2000 has been disclaimed.

[21] Appl. No.: 427,377

[22] Filed: Sep. 29, 1982

[51] Int. Cl.$^3$ .................. C01F 11/46; C01G 56/00; C01B 25/16

[52] U.S. Cl. .................. 423/555; 106/109; 423/11; 423/18; 423/166; 423/170; 423/321 R

[58] Field of Search .................. 106/109, 110; 423/2, 423/11, 18, 166, 167, 319, 321 R, 555, 170, 171, 172

[56] References Cited

U.S. PATENT DOCUMENTS

| | | | |
|---|---|---|---|
| 2,531,977 | 11/1950 | Hammaren et al. | 423/321 |
| 3,847,766 | 11/1974 | Klaus | 423/555 |
| 3,906,083 | 9/1975 | George | 423/555 |
| 3,949,047 | 4/1976 | Cherdron et al. | 423/555 |
| 3,951,675 | 4/1976 | Krempff | 423/555 |
| 4,146,568 | 3/1979 | Lange, Jr. | 423/555 |
| 4,282,192 | 8/1981 | Larson | 423/555 |
| 4,311,677 | 1/1982 | Gerunda et al. | 423/321 A |
| 4,328,193 | 5/1982 | Larson | 423/167 |

FOREIGN PATENT DOCUMENTS

| | | | |
|---|---|---|---|
| 1904496 | 8/1970 | Fed. Rep. of Germany | 423/172 |
| 577970 | 6/1946 | United Kingdom | 423/170 |
| 1103206 | 2/1968 | United Kingdom | 423/170 |
| 1394734 | 5/1975 | United Kingdom | 423/555 |

*Primary Examiner*—Gary P. Straub
*Attorney, Agent, or Firm*—Kenneth E. Roberts; Robert H. Robinson; Sam Kurlandsky

[57] ABSTRACT

A process for reducing radioactive contamination of phosphogypsum. Phosphogypsum containing radioactive material is calcined to form hemihydrate crystals carrying the radioactive contaminants, and a portion of the crystals is converted to substantially radiation-free gypsum crystals which are readily separated from the hemihydrate crystal relics containing substantially all of the radioactive contamination.

15 Claims, No Drawings

PROCESS FOR PURIFYING PHOSPHOGYPSUM

BACKGROUND OF THE INVENTION

1. Field of the Invention

This invention relates to a process for reducing the radioactive contamination in waste product phosphogypsum.

In the industrial production of phosphoric acid by wet methods, phosphate rock is reacted with concentrated sulfuric acid for simultaneously producing both phosphoric acid solutions and calcium sulfate products. The calcium sulfate, which may be recovered as dihydrate or phosphogypsum, hemihydrate, or anhydrite, is contaminated with most of the impurities originally present in the phosphate ore. In the past, these calcium sulfate products were generally discarded as unwanted by-products because of the impurities and large waste piles of these materials can be found at most phosphoric acid plants.

2. Description of the Prior Art

U.S. Pat. Nos. 3,949,047 and 4,282,192 disclose treating the monocalcium phosphate (MCP) solution during phosphoric acid manufacture prior to the precipitation of the calcium sulfate. In the former patent, the MCP solution is treated by adding barium compounds to reduce radium contamination, and in the latter patent, the MCP is treated with a sequestering agent and a first calcium sulfate precipitate high in radium is discarded. U.S. Pat. No. 4,146,568 discloses a process for reducing radioactive contamination in the phosphogypsum itself by slurrying it with a dilute sulfuric acid containing barium sulfate and separating the solids produced thereby into fine and coarse fractions. It discloses that the fine fraction predominates in the radioactive contamination. It does not disclose how much of the starting phosphogypsum is recoverable, but losses could be considerable. U.S. Pat. No. 3,984,525 discloses converting phosphogypsum by treating it with sulfuric acid at temperatures of about 75° C. to obtain a total sulfate content in the slurry of about 7%. Calcium sulfate hemihydrate is recrystallized and separated from the phosphoric acid solution (about 33% $P_2O_5$) whereby the concentration of the phosphoric acid is increased. This patent does not appear to disclose any reduction of radioactivity in the calcium sulfate products.

There is still a need in the art for an effective and economical means for removing a substantial portion of the radioactive material that is present in phosphate rock. There is a need for making calcium sulfate products that have acceptable levels of radioactivity such that they may be utilized in the manufacture of wallboard and other industrial and construction materials. There is also a need at the present time to provide improved processes for reducing the radioactive contaminants in waste product phosphogypsum, and particularly for such a process that may be performed at a location separate and away from the phosphate rock processing operations. The process of the present invention offers a solution to these needs.

SUMMARY OF THE INVENTION

It is an object and advantage of the present invention to provide a process for reducing radioactive contamination of phosphogypsum. Another object and advantage is the provision of a process for rapidly purifying waste phosphogypsum to reduce its high level of radioactivity. Still another object is the provision of a process for purifying phosphogypsum in which very large proportions of the waste phosphogypsum are converted to a purified product of lower radioactivity. Still another object is to provide a process for reducing radioactivity of phosphogypsum that may be performed at a location separate and away from the phosphate rock processing operations.

Broadly speaking, the present invention resides in reducing radioactivity of phosphogypsum by first thermally calcining the phosphogypsum to phosphohemihydrate. The radioactivity at this stage appears to remain in the calcium sulfate lattice. While the phosphohemihydrate is present as small, finely grained particles, a portion of the phosphohemihydrate particles is rehydrated to the dihydrate by adding a large proportion of pure gypsum seed crystals to the phosphohemihydrate slurry. This yields a gypsum product of very coarse particles which are substantially free of radioactivity. The small phosphohemihydrate crystals and crystallites which are still contaminated with radioactivity are readily separated from the higher purity, coarse gypsum particles. By careful control of time, temperature, and pressure, the calcination may be adjusted to produce fine phosphohemihydrate particles which are easily separated from the purified gypsum particles, and without setting into a hard gypsum mass. By careful control of time, and temperature, very large portions of the impure phosphogypsum may be converted to high purity gypsum and separated from the radioactive contaminated particles. The purified large gypsum crystals may be dehydrated to either alpha or beta hemihydrates which also are substantially radiation free and useful for conversion into industrial plaster products or the mnaufacture of gypsum wallboard.

DETAILED DESCRIPTION OF THE PREFERRED EMBODIMENTS

In the first step for purifying waste product phosphogypsum in accordance with the process of this invention, phosphogypsum containing radioactive contamination is thermally calcined to the hemihydrate. In our co-pending patent application entitled "Process For Reducing Radioactive Contamination In Phosphogypsum," Ser. No. 330,550, filed Dec. 14, 1981, we disclose that phosphogypsum can be dehydrated to the anhydrite form with large quantities of strong sulfuric acid and then reduced in radioactivity by partial conversion to, and separation of, coarse purified gypsum particles in the presence of large proportions of gypsum seed crystals. That process is not very appropriate for locations away from phosphate plants unless there is a ready use for the resultant sulfuric acid product. Conversion of phosphogypsum to the anhydrite form is time consuming in comparison to conversion to the hemihydrate, and proportionally more water of crystallization is involved in conversions from gypsum to anhydrite than in gypsum to hemihydrate. However, it was believed that the speed of hemihydrate formation from phosphogypsum, a matter of minutes, would present the problem of passing along non-hydrated, impure phosphogypsum particles that would carry radioactive contamination into the final product. Also, since the hemihydrate form is very unstable, the slightest cooling of the processing temperatures could cause the immediate rehydration of the phosphohemihydrate and the formation of hard, set gypsum masses. This would result in lengthy delays and major clean up costs in maintaining the processing equipment. In addition, since hemihydrate particles are much larger than anhydrite particles, it was expected that high conversion and separation efficiencies could not be achieved. Thus, it was believed that substantial reduction in radioactivity could not be achieved through a hemihydrate route on phosphogypsum.

By careful control of time, pressure, and temperature, phosphogypsum may be dehydrated to phosphohemihydrate in less than about one hour, generally in about 10 to 30 minutes, at pressures from atmospheric to about 60 psig and at temperatures of about 90°–177° C. The small sized phosphohemihydrate particles (about 5–100 micrometers in diameter, preferably less than about 53 micrometers) are suitable for further processing to remove radioactive contamination.

The thermal decomposition of the phosphogypsum to phosphohemihydrate in accordance with the present invention may generally be accomplished by dry kettle calcination at atmospheric pressure and temperatures of about 115° C.–160° C. by aqueous slurry pressure calcination under steam pressures up to about 60 psig and temperatures above 90° C.; or by dilute acid thermal dehydration such as in about 5–25% sulfuric acid at atmospheric pressures and temperatures between about 95° C. and about 110° C. The particular means for thermally calcining the radioactive contaminated phosphogypsum to phosphohemihydrate will merely be a matter of selecting the procedure that provides sufficiently slow calcination time for the particular processing plant. The phosphohemihydrate may be dried and classified, plus any optional grinding prior to classification, to assist in maintaining uniform small particle size. In the second stage of the process of this invention, it is preferred that the phosphohemihydrate be in the form of small particles.

In the second step for purifying phosphogypsum in accordance with the process of this invention, the phosphohemihydrate containing radioactive contaminants is mixed with sufficient water and coarser particles of pure gypsum seed crystals at a temperature between about 55° C. and 90° C. A substantial portion but less than all of the calcium sulfate from the phosphohemihydrate is hydrated onto the gypsum seed crystals to obtain coarse gypsum particles that are substantially free of radioactivity. The phosphohemihydrate particles, generally smaller than about 74 micrometers and preferably smaller than 53 micrometers, are mixed with purified gypsum seed crystals of at least greater than 30 micrometer size to form an aqueous slurry of about 10 to 60 weight % total calcium sulfate solids and about 1:9 to 9:1 weight proportion of phosphohemihydrate to purified gypsum seed crystals. A preferred temperature between about 80° and 90° C. will yield 75–90% conversion of the phosphohemihydrate to gypsum in about one half hour. Higher and lower temperatures will achieve respectively slower or faster conversions in e.g. about 10 minutes to 1 hour. Conventional calcium sulfate hydration rate modifiers, such as sulfuric acid or water soluble sulfates, or conventional retarders may be added in minor amounts to further adjust the rate of rehydration. For example, partial rehydration may be accomplished in one preferred embodiment at 85° C. in a neutral aqueous slurry; but if some sulfuric acid accelerator is present and the rate is too fast, it may be slowed by increasing the temperature to 90° C.

In the present process, hydration is allowed to continue to convert about 50–95% of the phosphohemihydrate to purified gypsum in a single pass. Conversions up to 99+% of radioactive phosphogypsum to purified gypsum may be accomplished by successive passage of the remaining phosphohemihydrate from the first partial hydration through about 1–5 or more successive rehydration passes using a fresh supply of purified gypsum seed crystals during each pass. By employing multiple passes, the radioactivity is concentrated in the remaining phosphohemihydrate crystals and crystallites. In this fashion, the contaminated portion may be increased in radioactivity to about 75–300 picocuries of radium-226 per gram of phosphohemihydrate material.

On the first hydration pass, gypsum seed crystals are preferably present in a proportion by weight of about 1:4 to 1:1 of hemihydrate to gypsum seed crystals. On subsequent successive partial hydrations, the proportion may then preferably vary more widely and the gypsum seed crystals may constitute from 10 to 90 weight % of the calcium sulfate present in the mixture. The gypsum seed crystal will be of coarse particle size, at least about 30–100 or more micrometers in diameter and preferably about 53 micrometers (270 mesh) or more for subsequent separation ease. Calcium sulfate dihydrate will rapidly build onto the seeds increasing the crystal size during hydration quite quickly to particle diameters of about 74 micrometer (200 mesh) diameters or more. This is a convenient size for ready separation with conventional hydraulic classification means e.g. hydroclones. Of course, the purified gypsum crystals must be grown to a size larger than the size of the phosphohemihydrate particles being utilized in this stage of the process in order to separate the purified crystals. For example, if the phosphohemihydrate particles are just less than 74 micrometers, the purifying gypsum crystals must be allowed to grow to substantially larger than 75 micrometers (e.g. 80–105 micrometers) for separation in most commercially available classification equipment. On second and subsequent successive hydration steps utilizing microhydroclones or centrifugal separators, substantially smaller sizes and size differences between the particles of phosphohemihydrate and the purified gypsum crystals may be used.

During the rehydration, calcium and sulfate ions are leached out of the phosphohemihydrate crystal lattice containing radioactive contamination and recrystallized onto the purified gypsum seed crystal to grow into larger or coarser calcium sulfate dihydrate crystals. By not allowing all of the phosphohemihydrate crystal or crystallite to convert, the radium contamination remains in the phosphohemihydrate crystal lattice. So long as the phosphohemihydrate crystal relic remains of a size on the order of about 1–75 micrometers (preferably greater than 1–5 micrometers) there is little or no adhering of the radiation contaminated phosphohemihydrate crystal relic onto the surface of the purified gypsum crystals during the ensuing separation. Further, it has been found that by making successive hydration passes and allowing the phosphohemihydrate relic to successively become smaller and smaller, it acts as a good concentrator for the radium. At the end of successive passes, the relic may now be on the order of sub-micromic to 10 micrometers in size, virtually colloidal, and the radiation has been concentrated into a smaller and smaller particle sized suspension. Thereby, suspended particles of highly concentrated radioactivity in phosphohemihydrate crystals may be separated by filtration or further concentrated to diminished colloidal size in a concentrated suspension for disposal in the usual manner for low level radioactive waste.

It is convenient in the third step of the process of the instant invention to separate not only a coarser gypsum product low in radioactivity from the remaining phosphohemihydrate containing radioactive contamination, but also a portion of intermediate sized purified gypsum particles for use as recycle seed crystals in a continuous process. A middle portion, say from greater than 50 micrometers but less than 100 micrometers average diameter particle size purified gypsum particles, may be recycled and mixed with fresh additional phosphohemihydrate. Further such intermediate sized purified gypsum particles may be used as seed crystals for subsequent successive treatments of the remaining phosphohemihydrate particles for hydrating a further portion of the contaminated phosphohemihydrate to gypsum substantially free of radioactivity.

The recovered gypsum product will be relatively large particles, low in radioactivity, with diameters that may range from 50-100 micrometers on a first pass to 90-250 micrometers on successive growth passes.

EXAMPLES

In accordance with the present invention, quantities of a phosphogypsum from an existing Florida stockpile were obtained and calcined in both wet and dry processes to produce the two common forms of phosphohemihydrate, alpha hemihydrate and beta hemihydrate. The Florida phosphogypsum samples had been received wet and were overdried prior to being submitted for analysis. Chemical analysis performed on the samples after drying at 40° C. was pH 2.87, combined water (between 40° and 230° C.) of 17.5%, 31.4% calcium oxide, 44.1% sulfate, 0.05% magnesium oxide, 2.9% silicon dioxide, 0.77% ferric oxide, 0.16% aluminum oxide, 0.13% phosphorous, 0.03% fluoride, 97 ppm water soluble potassium salts, 1352 ppm water soluble sodium salts, 72 ppm water soluble magnesium salts and 18 ppm water soluble chloride salts. Possible chemical reconstruction of the analyzed sample was 79.83% phosphogypsum and 12.58% hemihydrate due to the overdrying. The phosphogypsum was found to have a radioactivity count of $110\pm10$ pCi/gram gross alpha, $130\pm10$ pCi/gram gross beta and 22.67 pCi/gram averaged radium (calculated as an average of the 0.295, 0.352 and 0.609 MeV peaks of the lead $-214$ and bismuth $-214$ short-lived progeny measured at 3 weeks evaluation in equilibrium with the long-lived radium $-226$ precursors in the samples).

After calcining portions of the phosphogypsum to either the alpha or beta phosphohemihydrate, samples were subsequently purified by partially rehydrating the fine fractions of the phosphohemihydrate in a slurry of hot water or dilute acid onto coarse radiation-free gypsum seed crystals, then separating the larger purified gypsum from the phosphohemihydrate relic. The general procedure for the purification was to add 40 parts by weight of $+200$ U.S. standard mesh purified gypsum seed crystals and 100 parts by weight of $-270$ mesh phosphohemihydrate to a hydration solution consisting of 300 parts of pure water, optionally including 1.5 weight % sulfuric acid, held at a constant temperature with stirring for the appropriate amount of time for the partial hydration. The reaction was then quenched with isopropanol to stop any further hydration. The slurry was passed through a 270 mesh (53μ) screen with the $+270$ mesh portion being rescreened also at 270 mesh and the materials analyzed. Since the rehydration takes place in water or dilute acids, the phosphorous is also removed with the radium, producing a very clean low radium gypsum product.

EXAMPLE 1

Alpha Hemihydrate

Aliquots of the Florida phosphogypsum sample were submitted to batch slurry calcination in an autoclave at about 25 psig for between 30 and 60 minutes using a slurry of 100 parts by weight of the phosphogypsum plus 100 parts by weight of water and 0.63 parts by weight of conventional crystal habit modifiers.

A composite of the calcined samples was screened over a 270 mesh and analyzed. The $+270$ mesh alpha hemihydrate material was found to contain $210\pm10$ pCi/gram gross alpha, $170\pm10$ pCi/gram gross beta and 28.7 pCi/gram averaged radium 226 (calculated as described above), and contained 90.88 weight % hemihydrate and 1.10 weight % dihydrate.

A portion of the alpha phosphohemihydrate was hydrated in a hydration media containing 1.5% sulfuric acid at 80° C. for 30 minutes. This resulted in 133% new growth on the $+200$ mesh purified gypsum seed crystals, and the coarse fraction ($+270$ mesh) analyzed as 94.54% gypsum, 3.26% hemihydrate with a 3.1 pCi/gram averaged radium 226 count. The $-270$ mesh material analyzed as 80.87% gypsum, 10.88% hemihydrate and 33.3 pCi/gram averaged radium 226, showing that radiation is concentrating in the relic. This run produced very rapid and high percentage growth of purified gypsum onto the seed crystals.

In another run, an aliquot of the alpha hemihydrate was hydrated in the presence of 1.5% sulfuric acid at 85° C. for 30 minutes. This resulted in 42.5% new growth on the $+200$ mesh purified gypsum seed crystals (39% total hemihydrate conversion) and a $+270$ mesh product that was very highly purified: 95.45% gypsum, 2.45% hemihydrate, $26\pm5$ pCi/gram gross alpha, $16\pm5$ pCi/gram gross beta and 1.3 pCi/gram averaged radium.

The $-270$ mesh material in this run analyzed as 84.90% hemihydrate, 9.03% gypsum and 25.7 pCi/gram averaged radium. Thus the amount of radiation left in the desirable product appears to be a function of the amount of hemihydrate and the total conversion of the hemihydrate to gypsum. Comparing these first two runs, they both contained nearly the same amount of hemihydrate in the $+270$ mesh products and differ only in the extent of hemihydrate conversion (the 1st run had a conversion of 95% of the phosphohemihydrate to combined $+270$ mesh and $-270$ mesh gypsum material and 3.1 pCi/gram averaged radium in the purified gypsum product, while the 2nd run had a 39% total phosphohemihydrate to gypsum conversion and only 1.2 pCi/gram in the purified gypsum product).

A rough mass balance on the first run indicates that about half of the starting phosphohemihydrate went into the product and half went with the fine wastes. This would mean a concentrating factor of two for the waste fraction, which should result in a radiation count of around 50-60 pCi/gram. However, the actual radiation count of the waste material that passed through the 270 mesh screen contains significantly less radiation than was expected (33 pCi/gram), which is only slightly higher than the original phosphogypsum. It is believed that the radiation losses are a result of hemihydrate crystals which have hydrated to the point where they are so small that they are colloidal in nature and able to pass through the filter carrying radiation into the filtrate. The filtrate was analyzed in a subsequent run.

The above runs were made with sulfuric acid hydration accelerator in the hydration media because of the slow hydration rate of alpha hemihydrate. In comparison, for example, hydrating an aliquot of the alpha hemihydrate in pure water at 80° C. for 30 minutes did not result in any significant new growth on the purified gypsum seed crystals; and hydration in pure water at 60° C. for 30 minutes resulted in only 7.5% of new growth. To illustrate the opposite situation, hydration of the alpha hemihydrate sample with 1.5% sulfuric acid accelerator in the hydration media at 60° C. caused the slurry to gel into an oatmeal-like paste in 15 minutes. This reaction was so fast that there was only 51.3% new growth on the +270 mesh material since all of the gypsum that resulted in the gelling was contained in the −270 mesh fraction. Raising the temperature to 90° C. for hydration in the presence of 1.5% sulfuric acid resulted in only 2.5% new growth in 30 minutes.

EXAMPLE 2

Beta Hemihydrate

An aliquot of the waste dry phosphogypsum from above was dry calcined such as may be accomplished in an atmospheric heated kettle equipped with a stirrer. The kettle can be heated to approximately 104° C. until fill is completed, and then the heat increased to bring the mass to a boil (at a temperature of 115°–120° C.) and the boil or drag continued for about 1 hour. Chemical analysis on the product showed: 6% combined water between 40° C. and 230° C., 37.8% calcium oxide, 49.6% sulfate, 0.02% magnesium oxide, 2.3% silicon dioxide, 0.17% ferric oxide, 0.19% aluminum oxide, and 0.52% phosphorous for a possible chemical reconstruction of 87.7% beta hemihydrate and 2.5% dihydrate. Portions of the beta hemihydrate were screened over a 270 mesh with the −270 mesh fraction being used for hydration purification.

In a first run, an aliquot of −270 mesh beta hemihydrate in a pure water slurry with −100, +200 mesh purified gypsum seed crystals was kept stirring at 85° C. for 30 minutes and then quenched with isopropanol to stop any further hydration. The hydrated slurry was then screened as set forth in Example 1; and the dried +270 mesh material was dry screened a second time to ensure good particle size separation. This run resulted in 96% new growth onto +200 mesh gypsum seed crystals in the +270 mesh product, which analyzed as 97.79% gypsum, 1.63% hemihydrate and 3.76 pCi/gram averaged radium. The −270 mesh material analyzed as 33.26% gypsum, 57.33% hemihydrate and 30 pCi/gram averaged radium. It may be seen from these results that the coarse hydrated material was fairly high purity gypsum with very little trapped or adhering hemihydrate crystallites; and that there was very little dihydrate nucleation in the −270 mesh material.

The hydration step was repeated in another run with 1.5% sulfuric acid accelerator being added to the water and the slurry being maintained at 90° C. for 30 minutes. The +270 mesh material produced showed 96.8% new growth on the +200 mesh seed crystals, and it contained 95.2% gypsum, 2.5% hemihydrate and 4.7 pCi/gram of averaged radium. The −270 mesh material contained 28.8% gypsum, 62.8% hemihydrate and 28.34 pCi/gram averaged radium.

To evaluate the effect of not separating the hemihydrate into the smaller sized particles before the hydration step, a portion of the beta hemihydrate that was not screened (so as to allow the presence of large hemihydrate particles greater than 270 mesh) was hydrated at 80° C. in pure water for 15 minutes, and the hydration product separated into coarse and fine fractions. The coarse fraction (+270 mesh) was then rescreened over 100, 200 and 270 mesh screens. The rescreened product passing 100 mesh but retained on 200 mesh showed 93% new growth and analyzed to 87.9% gypsum, 8.7% hemihydrate and 6.5 pCi/gram averaged radium. The −200 mesh portion contained 67% gypsum, 24.4% hemihydrate and 19 pCi/gram averaged radium. This shows that not sizing the material between the calcination step and the hydration step greatly increases the amount of impurities carried into the resultant coarse product fraction.

From the above Examples it is apparent that radium from existing phosphogypsum may be removed to render the produced gypsum low enough in radiation to be acceptable as raw material for making wallboard and other construction materials. While the above Examples used screening for the classification step and the fine impure particles were separated from pure dihydrate by batch sieving through a standard mesh screen, it is apparent that continuous hydraulic classification means such as hydroclones and microclones will produce more effective and cleaner separations. In the foregoing Examples, particularly on hydrating the alpha phosphohemihydrate long needles of purified dihydrate are in many cases passing through the screen when their diameters are minus 270 mesh yet they will be retained on the screen if the length of the particle should lay crosswise the screen openings even though the particle's diameter is much smaller than 270 mesh. The efficiency of separating the large, low radioactivity gypsum particles from the finer particles containing the majority of the radioactive contamination obviously affects the final product purity. The addition of a chemical dispersant prior to classification will allow better control of the split between the fine and coarse particles. Depending upon the classification equipment utilized, various blends of fine and coarse fractions will determine the optimum relationship between particle size distribution and product purity for any particular production rate. The fine fraction from the classification step may be further classified to separate the small dihydrate crystals from the very fine hemihydrate crystals and crystallites not converted in the hydration step. The small dihydrate crystals may be recycled back to the hydrator to serve as further seed crystals essential to the purification conversion of the hemihydrate to dihydrate. The fine portion may be repeatedly hydrated and classified to concentrate virtually all of the radiation into colloidal suspension. The suspension may then be bound with a conventional binder for waste disposal or dried for further processing for waste disposal, or further diluted for liquid disposal.

What is claimed is:

1. A process for reducing radioactivity of phosphogypsum containing radioactive contamination comprising the steps of
(A) thermally calcining phosphogypsum containing radioactivity in about 10–60 minutes at a temperature between about atmospheric and 60 psig to yield phosphohemihydrate containing radioactivity;

(B) slurrying the phosphohemihydrate with sufficient water and purified gypsum seed crystals that are substantially free of radioactivity to form an aqueous slurry of about 10-60 weight % calcium sulfate solids and about 1:9 to 9:1 weight proportion of phosphohemihydrate to purified gypsum seed crystal;

(C) hydrating at a temperature between about 55° and 90° C., in about 10-60 minutes, a substantial proportion but less than all, of the phosphohemihydrate to gypsum substantially free of radioactivity; and (D) separating relatively larger gypsum particles substantially free of radioactivity from relatively smaller hemihydrate particles containing radioactive contamination.

2. The process of claim 1 in which the phosphogypsum containing radioactivity is thermally calcined to alpha phosphohemihydrate in an autoclave under steam pressure of from above atmospheric to 60 psig.

3. The process of claim 1 in which the phosphogypsum containing radioactivity is calcined to alpha phosphohemihydrate in the presence of about 5 to about 25 weight % sulfuric acid at atmospheric pressure and a temperature between about 95° and about 110° C.

4. The process of claim 1 in which the phosphogypsum containing radioactivity is thermally calcined to beta phosphohemihydrate at atmospheric pressure and a temperature from about 115° C. to about 160° C.

5. The process of claim 1 which includes the additional steps of:

(1) after step (A) and before step (B) separating the phosphohemihydrate into a finer fraction and a coarser fraction at 270 mesh; and (2) passing the finer fraction onto step (B).

6. The process of claim 5 including the further steps of grinding the coarser fraction to minus 270 mesh and passing the ground material of minus 270 mesh onto step (B).

7. The process of claim 1 in which the gypsum seed crystals added in step (B) are greater than 270 mesh.

8. The process of claim 7 in which the gypsum seed crystals added in step (B) are greater than 200 mesh.

9. The process of claim 1 in which the gypsum particles separated in step (D) are greater than 270 mesh.

10. The process of claim 9 in which the gypsum particles separated in step (D) are greater than 200 mesh.

11. The process of claim 1 in which in step (C) the temperature is between about 80° and 90° C.

12. The process of claim 1 in which in step (C) about 50-95% of the phosphogypsum is hydrated to gypsum substantially free of radioactivity.

13. The process of claim 1 in which in step (B) the proportions of phosphohemihydrate to purified gypsum seed crystal is about 1:4 to 1:1.

14. The process of claim 1 in which in step (D) the separated gypsum particles contain less than 5 pCi/g of averaged radium $-226$.

15. The process of claim 1 in which in step (D) the separated gypsum particles contain less than 3 pCi/g of averaged radium $-226$.

* * * * *